(12) United States Patent
Pierre

(10) Patent No.: US 6,672,246 B2
(45) Date of Patent: Jan. 6, 2004

(54) PIZZA-TOPPING APPARATUS

(76) Inventor: Jean E. Pierre, 200 W. Queen St., #206, Inglewood, CA (US) 90301

( * ) Notice: Subject to any disclaimer, the term of this patent is extended or adjusted under 35 U.S.C. 154(b) by 45 days.

(21) Appl. No.: 10/107,342

(22) Filed: Mar. 28, 2002

(65) Prior Publication Data

US 2003/0183164 A1 Oct. 2, 2003

(51) Int. Cl.$^7$ ................................................ A21C 9/04
(52) U.S. Cl. .......................... 118/13; 118/16; 118/17; 99/450.1; 99/494
(58) Field of Search ........................... 118/13, 16, 17, 118/24; 99/450.1, 443 C, 450.2, 494, 516; 426/292

(56) References Cited

U.S. PATENT DOCUMENTS

| | | | | |
|---|---|---|---|---|
| 3,717,752 A | * | 2/1973 | Warning .................... 239/654 |
| 3,719,504 A | * | 3/1973 | Greenspan et al. ........... 99/353 |
| 4,190,410 A | * | 2/1980 | Rhodes ....................... 425/239 |
| 4,554,852 A | * | 11/1985 | Sauer et al. .................. 83/407 |
| 5,121,677 A | * | 6/1992 | Le Claire et al. ............. 99/357 |
| 6,032,610 A | * | 3/2000 | Fitch et al. .................... 118/13 |
| 6,390,662 B1 | * | 5/2002 | Henry et al. ............. 366/177.1 |

* cited by examiner

*Primary Examiner*—Richard Crispino
*Assistant Examiner*—Michelle Aawedo Lazor

(57) ABSTRACT

A pizza-topping apparatus for dispensing automatically various toppings for pizzas at a pizzeria. The pizza-topping apparatus includes a conveyor assembly, including a housing having side, back, and bottom walls and also having an open top, and also including a conveyor belt movable through and along the open top of said housing; and also includes a storage assembly including a cabinet being mounted in the housing; and further includes a condiment dispensing assembly being securely mounted above the conveyor belt and including a plurality of dispenser members; and also includes an assembly for cleaning the dispenser members.

10 Claims, 4 Drawing Sheets

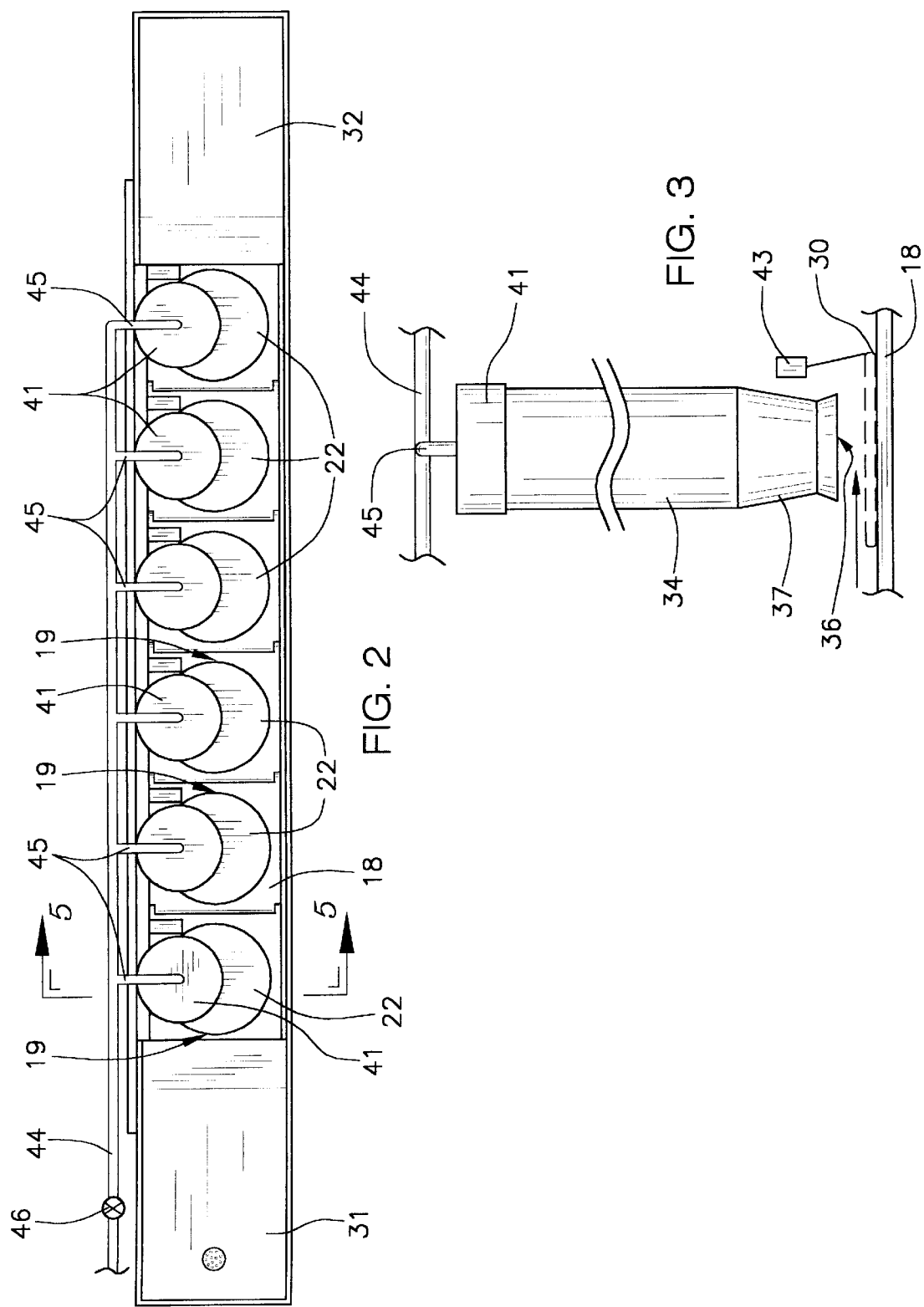

PIZZA-TOPPING APPARATUS

BACKGROUND OF THE INVENTION

1. Field of the Invention

The present invention relates to condiment dispensers for pizzas and more particularly pertains to a new pizza-topping apparatus for dispensing automatically various toppings for pizzas at a pizzeria.

2. Description of the Prior Art

The use of condiment dispensers for pizzas is known in the prior art. More specifically, condiment dispensers for pizzas heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 6,051,070; 4,152,976; 5,243,899; 3,662,677; 3,648,596; and U.S. Pat. No. Des. 248,225.

While these devices fulfill their respective, particular objectives and requirements, the aforementioned patents do not disclose a new pizza-topping apparatus. The prior art includes inventions having hoppers and conveyors upon which material is moved.

SUMMARY OF THE INVENTION

The general purpose of the present invention, which will be described subsequently in greater detail, is to provide a new pizza-topping apparatus which has many of the advantages of the condiment dispensers for pizzas mentioned heretofore and many novel features that result in a new pizza-topping apparatus which is not anticipated, rendered obvious, suggested, or even implied by any of the prior art condiment dispensers for pizzas, either alone or in any combination thereof. The present invention includes a conveyor assembly including a housing having side, back, and bottom walls and also having an open top, and also including a conveyor belt movable through and along the open top of said housing; and also includes a storage assembly including a cabinet being mounted in the housing; and further includes a condiment dispensing assembly being securely mounted above the conveyor belt and including a plurality of dispenser members; and also includes an assembly for cleaning the dispenser members. None of the prior art describes inventions having turntables supported upon and moved with conveyor belts.

There has thus been outlined, rather broadly, the more important features of the pizza-topping apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new pizza-topping apparatus which has many of the advantages of the condiment dispensers for pizzas mentioned heretofore and many novel features that result in a new pizza-topping apparatus which is not anticipated, rendered obvious, suggested, or even implied by any of the prior art condiment dispensers for pizzas, either alone or in any combination thereof.

Still another object of the present invention is to provide a new pizza-topping apparatus for dispensing automatically various toppings for pizzas at a pizzeria.

Still yet another object of the present invention is to provide a new pizza-topping apparatus that is easy and convenient to set up and use.

Even still another object of the present invention is to provide a new pizza-topping apparatus that allocates equal amounts of condiments for each and every pizza and also speeds up the process of making pizzas for productivity purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top planar view of the present invention.

FIG. 3 is a detailed side elevational view of a dispenser member of the present invention.

DESCRIPTION OF THE PREFERRED EMBODIMENT

Figure 1:
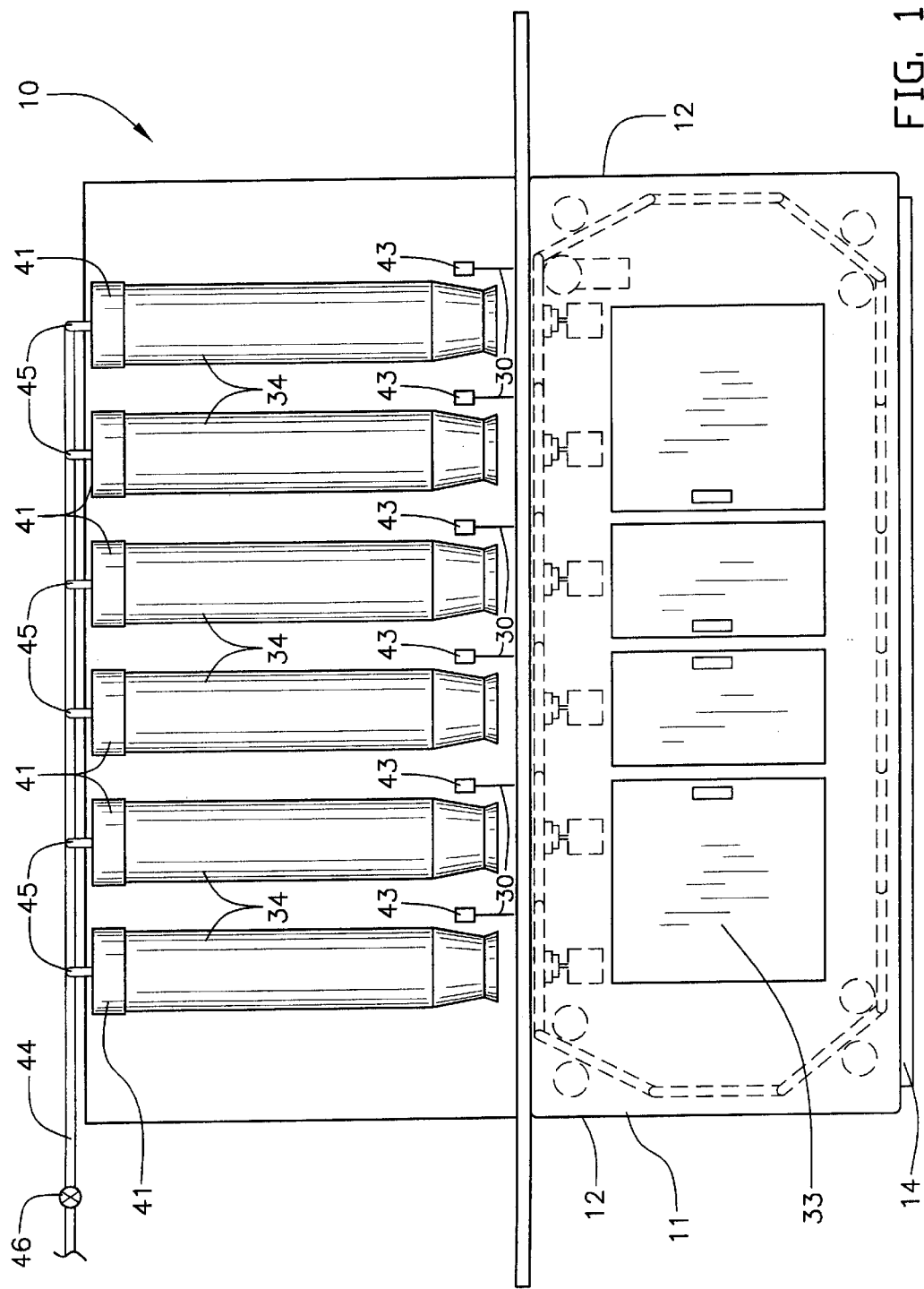
FIG. 1 is a side elevational view of a new pizza-topping apparatus according to the present invention and shown in use.
Figure 4:
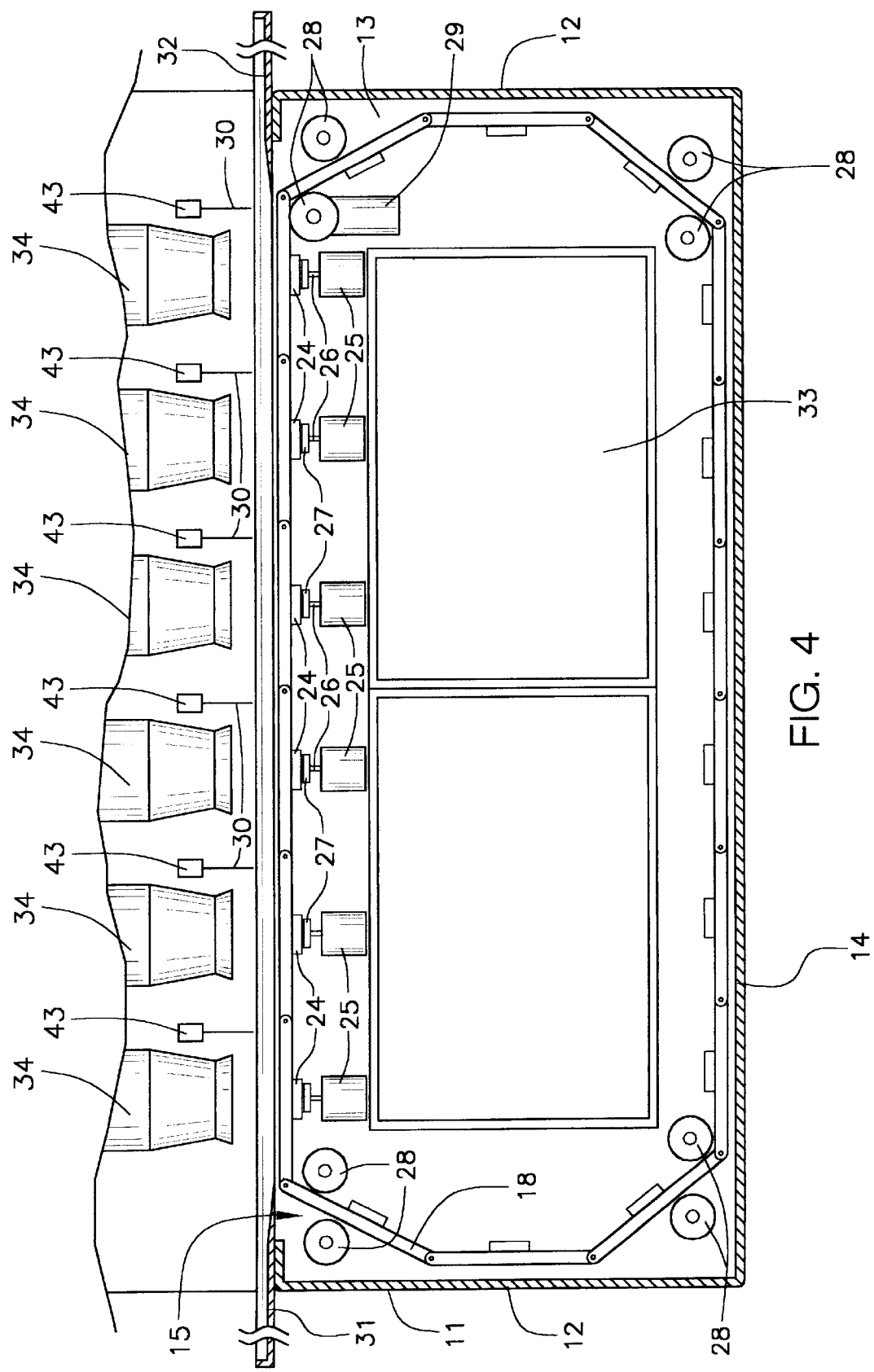
FIG. 4 is a detailed side elevational view of the conveyor assembly of the present invention.
Figure 5:
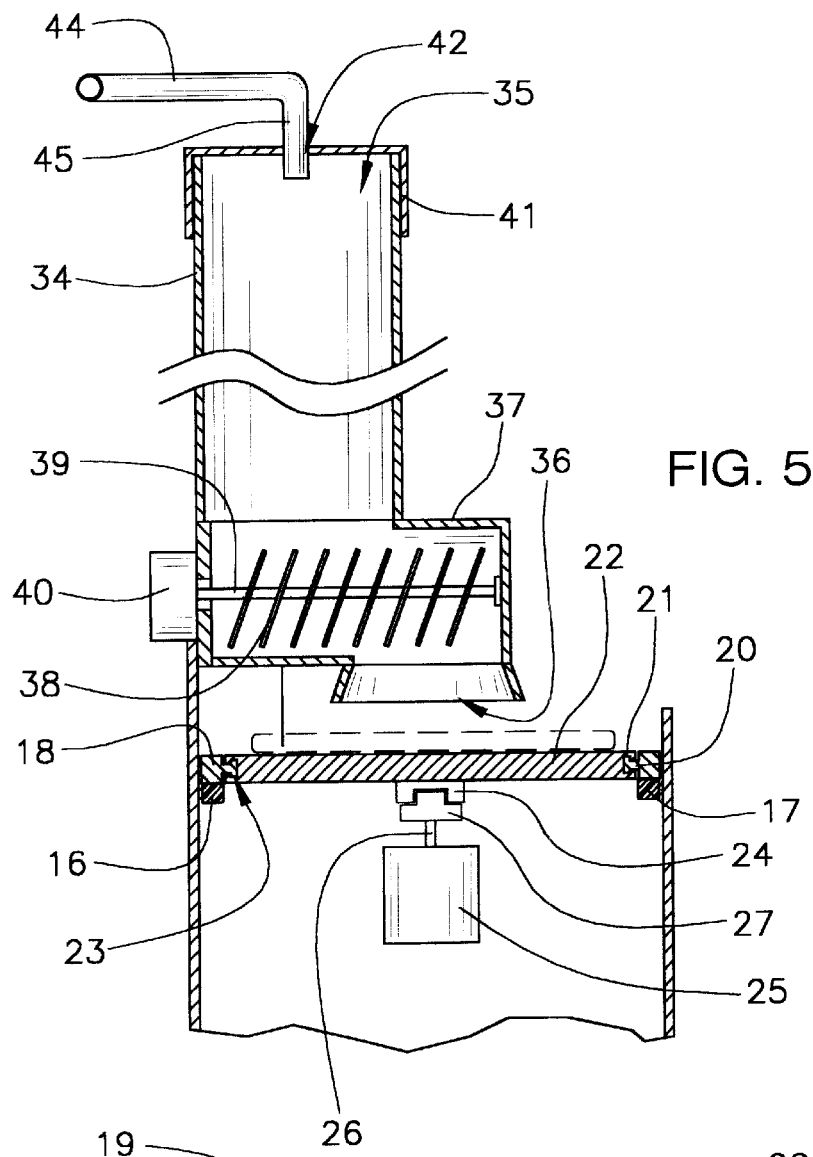
FIG. 5 is a cross-sectional view of a dispenser assembly of the present invention.
Figure 6:
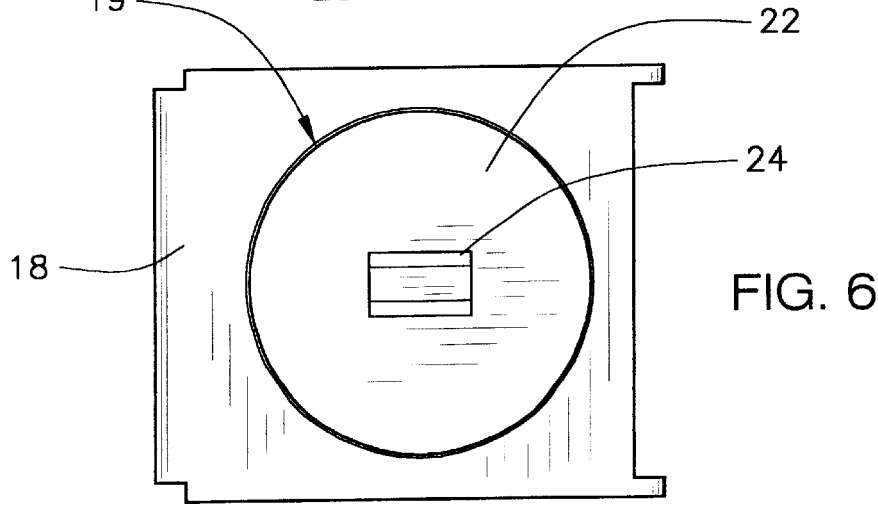
FIG. 6 is a detailed bottom plan view of the conveyor member of the present invention.

With reference now to the drawings, and in particular to FIGS. 1 through 6 thereof, a new pizza-topping apparatus embodying the principles and concepts of the present invention and generally designated by the reference numeral 10 will be described.

As best illustrated in FIGS. 1 through 6, the pizza-topping apparatus 10 generally comprises a conveyor assembly including a housing 11 having side, back, and bottom walls 12–14 and also having an open top 15, and also including a conveyor belt 18 being movable through and along the open top 15 of the housing 11. The conveyor assembly further includes rails 16,17 being conventionally attached at the open top 15 of the housing 11 and upon which the conveyor belt 18 is movably disposed. The conveyor belt 18 includes a plurality of circular openings 19 being aligned with one another and being spacedly disposed therethrough. Each of the circular openings 19 is defined by an annular edge 20 which has an annular flange 21 extending inwardly of the circular opening 19. The conveyor assembly also includes a plurality of turntables 22 being rotatably and conventionally disposed in the circular openings 19, and further includes a plurality of bracket members 24 being securely and conventionally attached to bottom sides of the plurality of turntables 22, and also includes a plurality of turntable motors 25 having rotatable shafts 26 and being spaced apart for rotating the turntables 22, and further includes a plurality of bracket engagement members 27 being securely and conventionally attached at ends of the rotatable shafts 26 and being engagable to the bracket members 24 for the rotation of the turntables 22. Each of the turntables 22 has an annular groove 23 being disposed in a circumferential edge thereof and receiving a respective annular flange 21 for supporting the turntable 22 upon the conveyor belt 18. The conveyor assembly further includes a plurality of roller members 28 being conventionally attached to the housing 11 for moving the conveyor belt 18, and also includes a conveyor motor 29 being conventionally connected to at least one of the roller members 28 for the rotation thereof, and further includes a power supply 30 such as a power cord being conventionally connected to the turntable motors 25 and to the conveyor motors 29 for the energizing thereof. The conveyor assembly also includes a pizza-loading platform 31 being conventionally mounted upon an end at the top 15 of the housing 11, and further includes a pizza-unloading platform 32 being conventionally mounted upon another end at the top 15 of the housing 11. A storage assembly includes a cabinet 33 being conventionally mounted in the housing 11.

A condiment dispensing assembly is securely and conventionally mounted above the conveyor belt 18 and includes a plurality of dispenser members 34. Each of the dispenser members 34 is a tubular member having a condiment-filling end 35, a condiment dispensing end 36, and a lower portion 37. The tubular members 34 are spaced apart and are conventionally suspended above the conveyor belt 18. The condiment dispensing assembly further includes a plurality of augers 38 being rotatably and conventionally disposed in the lower portions 37 of the tubular members 34 above the condiment-dispensing end 36, and also includes auger motors 40 being conventionally mounted to the tubular members 34 and being conventionally connected to shafts 39 of the augers 38 and being conventionally connected to the power supply 30, and further includes switch members 43 being conventionally connected to the power supply 30 for energizing the auger motors 40, and also includes a plurality of lids 41 being removably disposed upon the condiment-filling ends 35 of the tubular members 34 with each of the lids 41 having a holes 42 being disposed therethrough.

A means for cleaning the dispenser members 34 includes a main water line 44 having a plurality of branch lines 45 branching off the main water line 44 and being conventionally disposed through the holes 42 of the lids 41, and also includes a shutoff valve 46 being conventionally disposed inline of the main water line 44.

In use, the user places pizza dough upon the turntables 22, and energizes the conveyor motor 29 and the turntable motors 25 which move the pizza dough along the conveyor belt 18, and upon moving below a particular dispenser member 34, the switch member for that dispenser member 18 is activated which energizes the auger motor 40 which dispenses the particular condiment from that dispenser member 34 onto the pizza dough with the turntable being rotated as the condiment is being put on the pizza dough. The pizza dough is moved below each of the dispenser members 34 where the condiments from the dispenser members 34 are put on the pizza dough. When the all the condiments have been put on the pizza dough, the completed pizza is removed from the conveyor belt 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the pizza-topping apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pizza-topping apparatus comprising:
   a conveyor assembly including a housing having side, back, and bottom walls and also having an open top, and also including a conveyor belt movable through and along said open top of said housing;
   a storage assembly including a cabinet being mounted in said housing;
   a condiment dispensing assembly being securely mounted above said conveyor belt and including a plurality of dispenser members; and
   a means for cleaning said dispenser members.

2. A pizza-topping apparatus as described in claim 1, wherein said conveyor assembly further includes rails being attached at said open top of said housing and upon which said conveyor belt is movably disposed.

3. A pizza-topping apparatus as described in claim 2, wherein said conveyor belt includes a plurality of circular openings being aligned with one another and being spacedly disposed therethrough, each of said circular openings being defined by an annular edge which has an annular flange extending inwardly of said opening.

4. A pizza-topping apparatus as described in claim 3, wherein said conveyor assembly also includes a plurality of turntables being rotatably disposed in said circular openings and further includes a plurality of bracket members being securely attached to bottom sides of said plurality of turntables, and also includes a plurality of turntable motors having rotatable shafts and being spaced apart for rotating said turntables, and further includes a plurality of bracket engagement members being securely attached at ends of said rotatable shafts and being engagable to said bracket members for the rotation of said turntables.

5. A pizza-topping apparatus as described in claim 4, wherein each of said turntables has an annular groove being disposed in a circumferential edge thereof and receiving a respective said annular flange for supporting said turntable upon said conveyor belt.

6. A pizza-topping apparatus as described in claim 5, wherein said conveyor assembly further includes a plurality of roller members for moving said conveyor belt, and also includes a conveyor motor being connected to at least one of said roller members for the rotation thereof, and further includes a power supply being connected to said turntable motors and to said conveyor motors for the energizing thereof.

7. A pizza-topping apparatus as described in claim 6, wherein said conveyor assembly also includes a pizza-loading platform being mounted upon an end at said top of said housing, and further includes a pizza-unloading platform being mounted upon another end at said top of said housing.

8. A pizza-topping apparatus as described in claim 6, wherein each of said dispenser members is a tubular member having a condiment-filling end, a condiment dispensing end, and a lower portion, said tubular members being spaced apart and being suspended above said conveyor belt.

9. A pizza-topping apparatus as described in claim 8, wherein said condiment dispensing assembly further includes a plurality of augers being rotatably disposed in said lower portions of said tubular members above said condiment-dispensing end, and also includes auger motors being mounted to said tubular members and being connected to shafts of said augers and being connected to said power supply, and further includes switch members being connected to said power supply for energizing said auger motors, and also includes a plurality of lids being removably disposed upon said condiment-filling ends of said tubular members, each of said lids having a holes being disposed therethrough.

10. A pizza-topping apparatus as described in claim 9, wherein said means for cleaning said dispenser members includes a main water line having a plurality of branch lines branching off said main water line and being disposed through said holes of said lids, and also includes a shutoff valve being disposed inline of said main water line.

* * * * *